United States Patent [19]

Baumgartner

[11] 4,191,316
[45] Mar. 4, 1980

[54] MOTORCYCLE CARRIER

[76] Inventor: Paul A. Baumgartner, 8906 Mills Ave., Whittier, Calif. 90605

[21] Appl. No.: 1,885

[22] Filed: Jan. 8, 1979

[51] Int. Cl.² .............................................. B60R 9/00
[52] U.S. Cl. ............................. 224/42.03 B; 414/462
[58] Field of Search ................. 224/42.03 B, 42.03 R, 224/42.08, 273, 30 R, 309, 310; 254/139.1, 144, 166; 414/462

[56] References Cited
U.S. PATENT DOCUMENTS

| | | | |
|---|---|---|---|
| 2,491,967 | 12/1949 | Ghant | 254/139.1 |
| 2,634,431 | 4/1953 | Bickford | 254/139.1 |
| 2,896,804 | 7/1959 | Ingram | 414/462 |

Primary Examiner—Kenneth W. Noland
Attorney, Agent, or Firm—Edgar W. Averill, Jr.

[57] ABSTRACT

A motorcycle carrier for use on the bumper of a vehicle. The carrier has a frame member which is attached to the bumper of the vehicle and first and second upright members are affixed to the frame member. The upright members have generally horizontal arms, and a cable is held by the arms and provided with a crank to raise a motorcycle so that it may be held to the bumper during transit.

5 Claims, 4 Drawing Figures

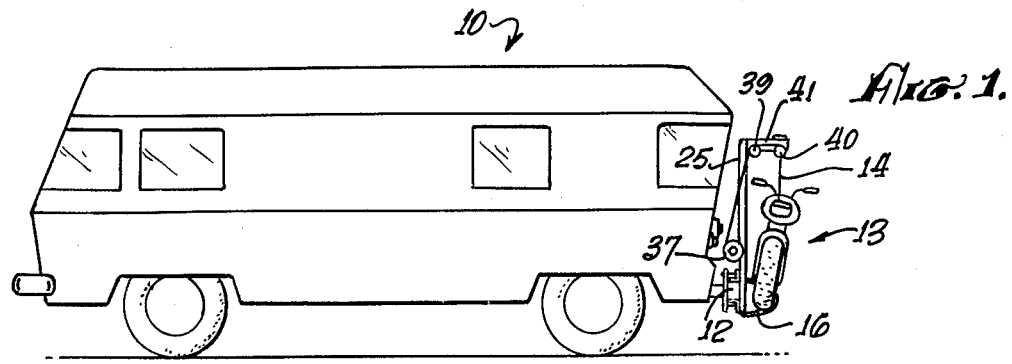
Fig. 1.
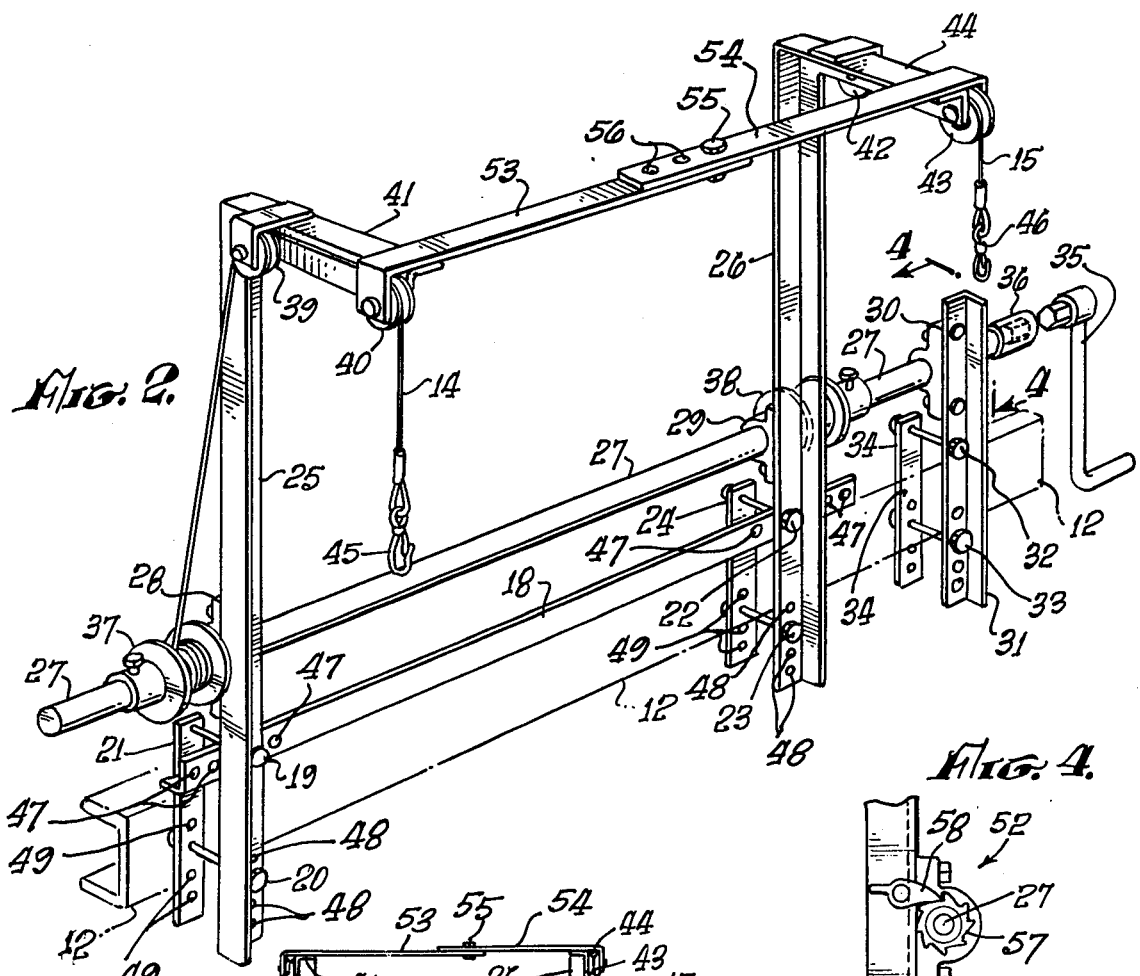
Fig. 2.
Fig. 4.
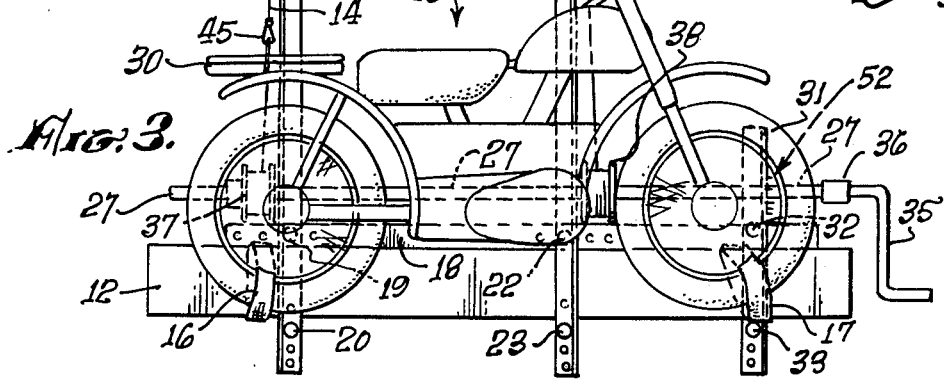
Fig. 3.

MOTORCYCLE CARRIER

BACKGROUND OF THE INVENTION

The field of the invention is carriers for attachment to vehicles. The invention relates more specifically to motorcycle carriers affixed to the back or front of a camper, motor home, or other vehicle.

Numerous devices are used to carry a motorcycle on the front or back bumper of a camper, motor home, or other vehicle. Such devices are shown in U.S. Pat. Nos. 3,754,672; 3,931,903; and 3,760,965. All of these devices, however, hold the motorcycle from underneath the wheels, and thus require either lifting or driving the motorcycle onto the rack, or elaborate hoisting mechanisms for lifting the rack once the motorcycle has been placed thereon.

There are numerous other devices used to carry boats on the top of vehicles; such devices are shown in U.S. Pat. Nos. 3,730,334; 3,139,203; 3,885,689; 3,952,893; and 3,215,294. Other hoists useful on vehicles are shown in U.S. Pat. Nos. 3,608,759 and 3,804,263. The devices useful for carrying boats on the top of vehicles typically are not useful for motorcycles and the like because they would not permit the motorcycle to be held upwardly and instead would require it to be placed on its side. This would result in a substantial safety hazard resulting from the leakage of gasoline. All of the hoist devices set forth above are adapted to lift the object to be carried, and to place it downwardly onto a rack or into the trunk of a vehicle. None of the above-listed devices are designed to hold the vehicle by suspending the same during transit. The result is the devices must be elaborate, because they need not only have a hoisting device but also a carrying rack.

SUMMARY OF THE PRESENT INVENTION

It is an object of the present invention to provide a motorcycle carrier which holds the motorcycle by suspending the same, and which is easy to use, requiring a minimum of strength.

The present invention is for a motorcycle carrier for use on the bumper of a vehicle. The carrier has a frame member which is attached to the bumper, and first and second upright members are affixed to the frame member. The upright members extend upwardly a height in excess of the height of the motorcycle to be carried, and are separated horizontally a distance less than the length of the motorcycle to be carried. Each of the upright members has a generally horizontal arm affixed to the upper end thereof. Bearing means are likewise affixed to the upright members at a point near the frame member. A shaft is held by each of the bearing means in such a way as to permit the rotation of the shaft. First and second cable means are affixed to the shaft and pass upwardly from the shaft to bearing means held on the arms affixed to the first and second upright members. Hook means are attached to the extremity of both of the cables. The hooks are equipped to be attached to the upper extremity of the motorcycle to be carried, so that they motorcycle is hung from the cables during transit. Handle means are affixed to the shaft to facilitate the rotation thereof, and ratchet means hold the shaft against reverse rotation until the ratchet has been released. Means are provided to attach the lower portion of the motorcycle to the bumper. Preferably, a third bearing is affixed to the bumper so that the shaft is supported near the handle end thereof. Also, the handle is, preferably, removable, to reduce the outward protrusion from the vehicle.

BRIEF DESCRIPTION OF THE DRAWINGS

FIG. 1 is a side view of a motor home having the motorcycle carrier of the present invention attached to the rear bumper thereof.

FIG. 2 is a perspective view of the motorcycle carrier of FIG. 1.

FIG. 3 is a side elevation of the motorcycle carrier of the present invention having a motorcycle suspended therefrom.

FIG. 4 is a cross-sectional view taken along line 4—4 of FIG. 3.

DESCRIPTION OF THE PREFERRED EMBODIMENTS

A motor home 10 is shown in FIG. 1. The motor home has a motorcycle carrier, indicated generally by reference character 11, bolted to the back bumper 12. A motorcycle 13 is suspended by a pair of cables 14 and 15, shown more clearly in FIG. 2 below. The wheels of the motorcycle are strapped to the bumper by a pair of straps 16 and 17.

Turning now to FIG. 2, a frame member 18 rests on the upper surface of bumper 12 and is held thereto by two pairs of bolts 19 20, 22, and 23 which pass through two uprights (described below) and bolt to two straps 21 and 24 on the inner surface of the bumper. Frame member 18 has a plurality of holes 47 which permit changing the lateral location of uprights 25 and 26 along member 18. Similarly, uprights 25 and 26 have several holes 48 and straps 21 and 22 have holes 49 which allow bolts 20 and 23 to be positioned at an appropriate location depending on the height of the bumper 12.

The bolts and straps securly hold two upright members 25 and 26 to bumper 12. Upright members 25 and 26 are fabricated from angle iron of sufficient strength to support the motorcycle to be carried. A pair of cross members 53 and 54 are bolted together by bolt 55 and provide additional support for the assembly. A plurality of holes 56 also permit width adjustment between the uprights. Of course, it is possible to use the carrier of the present invention for devices such as snowmobiles or other objects of an appropriate size and weight, and it is not intended to limit the use of the present invention to motorcycles, although it is particularly adapted for that use.

A shaft 27 is held to upright members 25 and 26 by a pair of pillow blocks 28 and 29. These, of course, allow shaft 27 to turn freely. Furthermore, shaft 27 is supported by pillow block 30, which is bolted to brace member 31 which, in turn, is bolted to bumper 12 by bolts 32 and 33, which are held to strap 34. Handle 35 fits into sleeve 36 and may be readily removed to prevent it from extending beyond the side of the motor home 10.

A pair of drums 37 and 38 are bolted to shaft 27, and cables 14 and 15 are held thereby. Drums 37 and 38 are longitudinally movable along shaft 27 to facilitate width adjustment between uprights 25 and 26. Cable 14 passes through pulleys 39 an4 40, which are rotatingly held on generally horizontal arm 41. It is, of course, within the purview of the present invention that arm 41 be curved or pointing upwardly or pointing downwardly, and the term "generally horizontal" is intended to include those configurations. Similarly, cable 15 passes over pulleys 42 and 43, which are rotatingly held by generally horizontal arm 44. The term "pulley means" as used herein is intended to include any device which will facilitate the moving of a cable over its surface. A clip 45 is affixed to the end of cable 14, and a clip 46 is attached to the end of cable 15. These clips attach to motorcycle 13 at appropriate attachment points, as shown in FIG. 3. The location of the attachment points will depend on the design of the motorcycle. For the motorcycles shown, cable 14 is attached by clipping clip 45 into the luggage rack 50. Clip 46 is held to an eye 51 which has been bolted to the motorcycle frame.

In operation, the motorcycle is driven to a point below cables 14 and 15, which are lowered and clipped to the appropriate attachment points on motorcycle 13 which, at that time, may be resting on its kickstand. Handle 35 is then placed into sleeve 36 and turned in a clockwise direction, raising the motorcycle into the air. When the bottom of the motorcycle wheels about reach the bottom of bumper 12, then straps 16 and 17 are placed throught the spokes and tightened to hold the wheels against bumper 12. The result is that the motorcycle is securely attached to the carrier, and ready for transportation. The operation is reversed by removing straps 16 and 17, and releasing the ratchet means 52, which are affixed to pillow block 30. Ratchet means 52 have a ratchet 57 and spring biased pawl 58.

The resulting motorcycle carrier is both light in weight and very easy to use. It may be readily equipped with locks to reduce the possibility of theft. The carrier is surprisingly easy to use, and the mechanical advantage resulting from the use of the drum and cable arranement shown in the drawings readily permits even a child to raise a motorcycle onto the carrier.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A motorcycle carrier for use on the bumper of a vehicle, said carrier comprising:
    a frame member including means for attachment to the bumper of a vehicle;
    first and second upright members affixed to said frame member, and extending upwardly a height in excess of the height of the motorcycle to be carried, and separated horizontally a distance less than the length of the motorcycle to be carried, each of said upright members having a generally horizontal arm affixed to the upper end thereof;
    bearing means comprising a first bearing means affixed to said first upright member and a second bearing means affixed to said second upright member at a point near said frame member;
    shaft means held by each of said bearing means to permit the rotation of said shaft;
    first and second cable means affixed to said shaft and passing upwardly from said shaft means to pulley means held on said arms affixed to said first and second upright members;
    hook means attached to the extremity of both of said cable means for attachment to two points on the upper extremity of the motorcycle to be carried so that said motorcycle is hung from said cables;
    handle means affixed to said shaft to facilitate the rotation thereof;
    ratchet means affixed to said shaft to prevent the unwinding of said cable after the cable has been wrapped about the shaft and a load is exerted on said cable; and
    means to affix the lower portion of said motorcycle to said bumper.

2. The carrier of claim 1, further including a third bearing means affixed to a frame member attachable to the same bumper of a vehicle as the first of said bearing members at a point between the handle and the first bearing member.

3. The device of claim 1 wherein said handle means are removable.

4. The device of claim 1 further including a pair of drum means affixed to said shaft, and attached to said cables to increase the length of cable moved for each revolution of the shaft.

5. The carrier of claim 1 wherein said pulley means held on said arms comprises a pair of pulley means on each arm, the first of said pulley means being positioned near the forward end of each arm and the rearward pulley means being positioned near the rearward extremity of said arm.

* * * * *